United States Patent
Brown

(10) Patent No.: US 6,738,928 B1
(45) Date of Patent: May 18, 2004

(54) METHOD AND EXPERT SYSTEM FOR ANALYSIS OF CRASH DUMPS

(75) Inventor: John Keith Brown, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 662 days.

(21) Appl. No.: 09/596,460

(22) Filed: Jun. 19, 2000

(51) Int. Cl.[7] .................................................. G06F 11/00
(52) U.S. Cl. ............................................ 714/26; 714/45
(58) Field of Search .............................. 714/26, 37, 38, 714/57, 45, 48

(56) References Cited

U.S. PATENT DOCUMENTS

| | | | |
|---|---|---|---|
| 4,108,360 A | * 8/1978 | Beismann et al. ............. 714/45 |
| 5,111,384 A | 5/1992 | Aslanian et al. ............. 395/575 |
| 5,463,768 A | * 10/1995 | Cuddihy et al. ............. 714/37 |
| 5,469,463 A | 11/1995 | Polich et al. ............. 395/182.18 |
| 5,627,964 A | * 5/1997 | Reynolds et al. ............. 714/46 |
| 5,819,024 A | * 10/1998 | Kasuga et al. ............. 714/26 |
| 5,884,019 A | * 3/1999 | Inaho ............. 714/6 |
| 5,928,369 A | * 7/1999 | Keyser et al. ............. 714/47 |
| 6,170,055 B1 | * 1/2001 | Meyer et al. ............. 713/2 |
| 6,226,761 B1 | * 5/2001 | Berstis ............. 714/37 |
| 6,415,395 B1 | * 7/2002 | Varma et al. ............. 714/37 |
| 6,430,707 B1 | * 8/2002 | Matthews et al. ............. 714/37 |
| 6,560,726 B1 | * 5/2003 | Vrhel et al. ............. 714/55 |

\* cited by examiner

*Primary Examiner*—Robert Beausoliel
*Assistant Examiner*—Gabriel Chu

(57) ABSTRACT

An automated method for analyzing crashes of a computer operating system begins with writing a dump file with the operating system state at the time of the crash. The dump file is processed to collect footprint information from the dump file into a footprint file, and a matching underlying cause is found by searching a footprint rule database for a match against the footprint information. Cause and repair information corresponding to the matching underlying cause is then extracted from a knowledgebase and merged with the footprint information for presentation to a technician.

7 Claims, 4 Drawing Sheets

US 6,738,928 B1

METHOD AND EXPERT SYSTEM FOR ANALYSIS OF CRASH DUMPS

FIELD OF THE INVENTION

The invention relates to computer operating systems, and in particular to the art of diagnosing failures in computer systems so that corrective action may be taken.

BACKGROUND OF THE INVENTION

As with anything else made by man, computer operating systems are known to fail. Operating system failures that result in cessation of operation are known as fatal operating system crashes. Frequent crashes can cause substantial interference with use of a system, both through system unavailability and possible data loss.

In addition to fatal crashes, operating systems may encounter recoverable abnormal conditions. These abnormal conditions may also interfere with use of the system, and severe ones can also be considered system crashes.

Operating system crashes have many different causes. These include hardware defects, programming errors in operating system modules, misconfiguration of the system or of driver modules, programming errors in application programs running on the system, and incompatibilities between operating system and driver modules. Commercial operating systems may have hundreds of potential causes of crashes.

Many suppliers of operating systems have contractual obligations to provide maintenance by helping their customers avoid repeated crashes. Maintenance contractors also contract to help customers avoid repeat crashes. Many problems that cause system crashes can be fixed to prevent repeated crashes. Fixing crash causes requires that the causes be understood because "fixes" applied blindly can not only fail to fix the problem, but introduce new problems into or aggravate old problems of a system.

Many crash causes that occur on a customer's machine have or will cause crashes on machines of other customers. Many maintainers of operating systems therefore maintain crash databases of information about past crashes, with underlying cause information and possible fix information for those crashes.

Analysis of operating system crashes to determine underlying causes is often performed manually by skilled technicians. These technicians perform dump analysis by reviewing "crash dumps" and error logs recorded by the system at the time of the crash, as well as a crash database. A "crash dump" is typically a recording, often formatted for printing, of relevant portions of system memory and register contents as they existed at the time the system crashed. Crash dumps are often recorded in a dump file on a filesystem of the machine that has suffered an operating system crash.

Manual dump analysis by skilled technicians is time consuming and expensive. Dump analysis is particularly expensive because of the high level of training and experience required before a technician is sufficiently expert to perform manual dump analysis accurately. It is therefore desirable that dump analysis be automated.

Crash dump files may be extremely large. Individual dump files may be tens to several hundreds of megabytes in size; it is therefore undesirable to store large numbers of crash dump files on a customer's machine.

U.S. Pat. No. 5,111,384 describes a system wherein portions of dump files are transmitted on request from a remotely located host system that has crashed to a centralized system having an expert system. The expert system thereupon analyzes the dump files to determine whether they match a known pattern in its knowledge base, and reports which if any known pattern scores a match.

Many operating systems have diagnostic modes wherein their functionality is restricted, but their reliability is enhanced. For example, the UNIX and LINUX operating systems have a single-user mode, and the Windows system has its Safety Mode. Further, a second, diagnostic, copy of an operating system may be installed on a machine with the minimum set of drivers needed for basic functions. These diagnostic modes may permit access to a system despite significant misconfiguration or bugs; it is known that these diagnostic modes can be substantially more robust than the normal operating mode for the same operating system on the same machine.

SUMMARY OF THE INVENTION

An intelligent system, the Crash Analysis Tool (CAT), for interpreting and analyzes operating system crashes has been constructed.

This CAT has a parameter extraction module that runs when the system reboots. In the event that the reboot was a result of a system crash, this module collects a predetermined set of operating-system-dependent key fields and parameters, including parameters expected to be of use in diagnosing the underlying causes of crashes. Extracted parameters are stored as a crash footprint in a footprint file.

When analysis is desired, a collector and parser module gathers the key fields of the footprint from the footprint file and translates this information into a suitable format for an analysis engine. The analysis engine then locates any matching rule in its knowledge base. If a match is found, repair suggestions from a repair suggestion file is merged with the footprint and formatted for display to a technician. If no match is found, the footprint information is formatted and displayed.

CAT can be run under any of several operating systems, including systems selected from Linux, OpenVMS, Windows NT, and Compaq Tru64 Unix, and is operable on a variety of hardware, including Alpha and Intel Pentium family and Xeon processors. CAT can run under a different hardware and operating system combination than that of the crashed system.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENT

Figure 1:
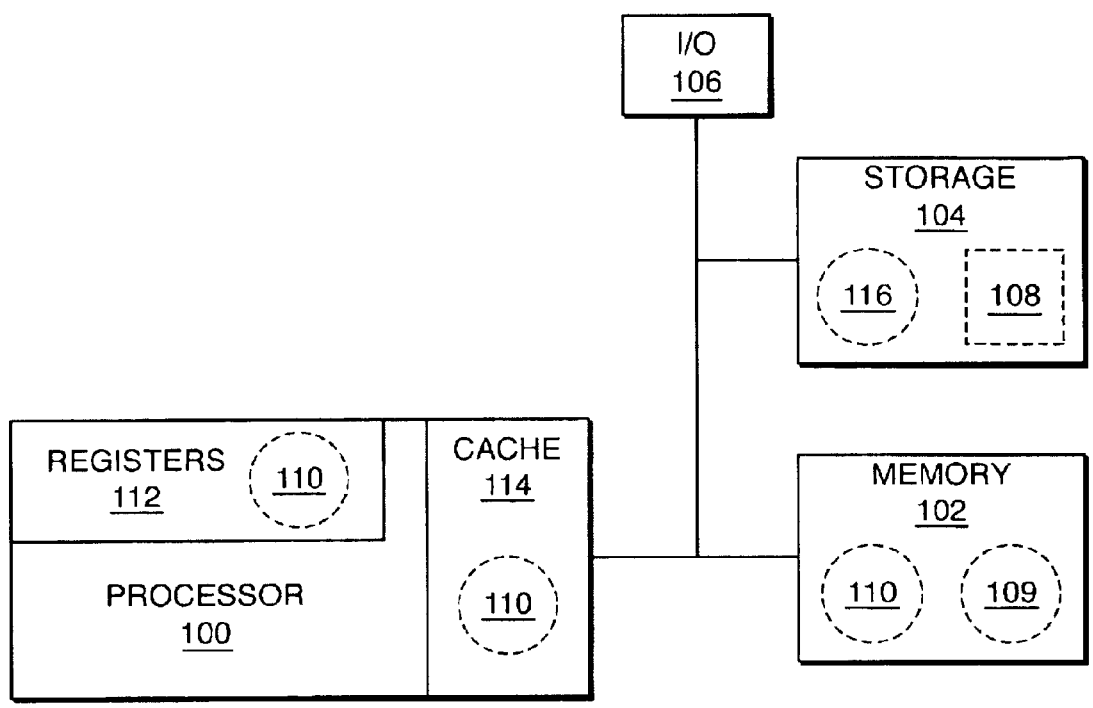
FIG. 1 is a block diagram of a computer known in the art, showing operating system run-time storage and a dumpfile.

A computer has at least one processor 100, memory 102, a storage system 104, and I/O devices 106. The storage system 104, which usually incorporates one or more disk drives (not shown), stores computer code comprising an operating system 108 that is executed by the at least one processor 100 along with other programs. As typical in the art, portions 109 of the computer code comprising the operating system 108 are loaded into memory 102 for execution, and run-time operating system information 110, such as stacks and variables, is stored in memory 102 during execution of the operating system. Yet more run-time operating system information may also be stored in the storage system 106. Additional run-time operating system information may also be stored in registers 112 and cache memory 114 of the at least one processor 100 during execution.

When the operating system 108 suffers and detects an abnormal condition, or crashes, at least some of the run-time operating system information 110 is copied into a dump file 116 stored on storage system 104. Portions 109 of the operating system 108, as loaded in memory, may also be incorporated into dump file 116. The dump file thereupon contains state information of the operating system at the time of the abnormal condition.

Once the dump file 116 has been stored in storage system 104, the operating system may attempt to recover from the abnormal condition or may reboot itself.

When the operating system reboots on the affected machine 201 after an abnormal condition, a collector module 200 is executed to extract crash footprint information from the dump file 116 into a footprint file 202. This collector module is a module of the Crash Analysis Tool (CAT) The crash footprint information comprises a predetermined set of operating-system-dependent key fields and parameters, including parameters expected to be of use in diagnosing the underlying causes of crashes. These parameters are specific to the crashed operating system, different parameters may be collected from a Linux crash dump than from a Windows NT dump. The collector module need not operate upon the same operating system as the crashed system.

Crash footprint information from multiple crashes can be stored in footprint file 202 for later analysis, while consuming less storage space than would be required for multiple dump files.

Crash footprint information from the footprint file 202 is then converted to a suitable form for analysis engine 204 by parser 206 and instance generator and translator 208. This form is in "CLIPS" format, for the "C Language Interpretive Production System."

The analysis engine 204 then searches a footprint rule database 210 for any rules that match the parsed and translated footprint. Matching rules 212 and information from the footprint are then merged 214 with rule-dependent information extracted from a repair suggestion database, here fix database 216, and formatted for display to a technician. If no match is found, the footprint information is formatted and displayed.

In the event that an operating system crashes with great frequency, it may be impossible to keep it running in its normal operating mode long enough to run CAT on that system. This may happen, for example, if a particular peripheral fails or is grossly misconfigured.

Figure 3:
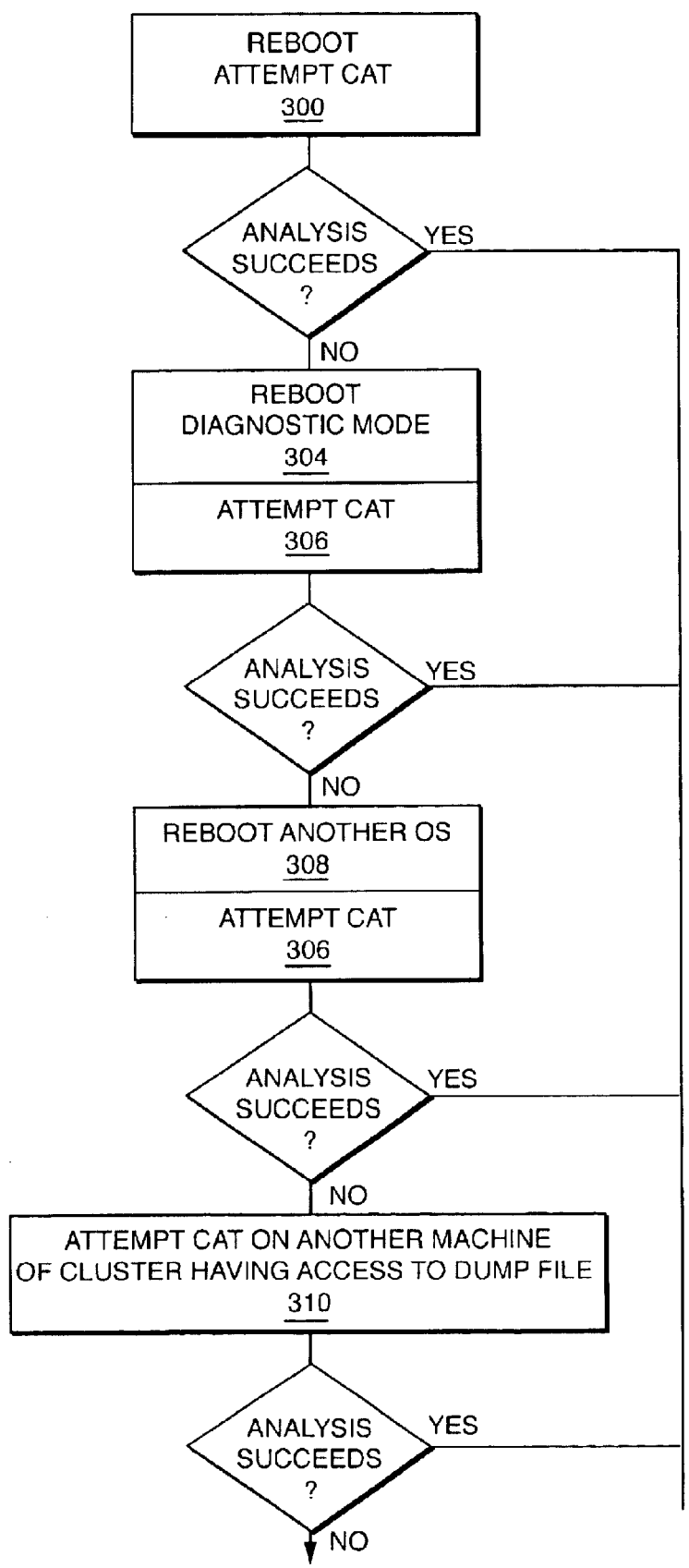
FIG. 3, a flow diagram illustrating alternatives for analysis on systems suffering problems of various severity.

Should the machine and operating system combination reboot and attempt the analysis 300 (FIG. 3), but the system is too unstable to perform the analysis, the machine may be rebooted into a diagnostic mode 304 of the operating system such as those known as "Safety Mode" for Windows, or "single user mode" in Linux and Tru64 Unix. These modes are often more crash-resistant than normal operating modes for a number of reasons, including that they load fewer and simpler drivers.

If the CAT is attempted 306 in the diagnostic mode and fails to complete because the system is too unstable to run, the system may be rebooted 308 into a different operating system. This different operating system may prove more stable than the crashed system because it will load a different set of drivers and driver configurations than the crashed system. It(is known that different operating systems may coexist in different partitions, being selected at boot time. Further, there are machines that are capable of executing different operating system in separate processors of the same machine simultaneously. The different operating system, such as a Linux system running on a machine that crashed under Windows NT, can be configured to have access to the crashed system's driver and driver configuration files; thereby permitting some types of fixes to be made while the machine runs the different system.

It is preferred that the collector 200 be able to automatically detect the type and version of operating system under which the dump file 116 was written, so that it may collect a footprint appropriate to the detected type and version of the operating system. Similarly, the footprint rule database 210 and the fix database 216 used are preferably automatically selected from a group of databases such that the rules and fixes are appropriate to the detected operating system.

When CAT is run on a different operating system than that which crashed and created the dump file 116, the collector 200 collects footprint information into the footprint file 200 appropriate to diagnosis of the crashed system, not the system currently running on the machine. Similarly, the rule database 210 and fix database 216 used have rules appropriate to the crashed system.

If CAT is still unable to run, it may be possible to run CAT on another machine 310 of a cluster that has access to the dump file.

When necessary, further diagnosis may be achieved by running a second phase of analysis. This may be useful in cases similar to when a system crash occurs in a first driver or program, but is a result of an incompatibility of that first driver or program with a second driver or program. The match results may indicate that the first driver was present, crashed, and that the crash could have been due to presence of the second program, but information about the second program was not gathered by collector 200 as it was not expected to be relevant.

Figure 4:
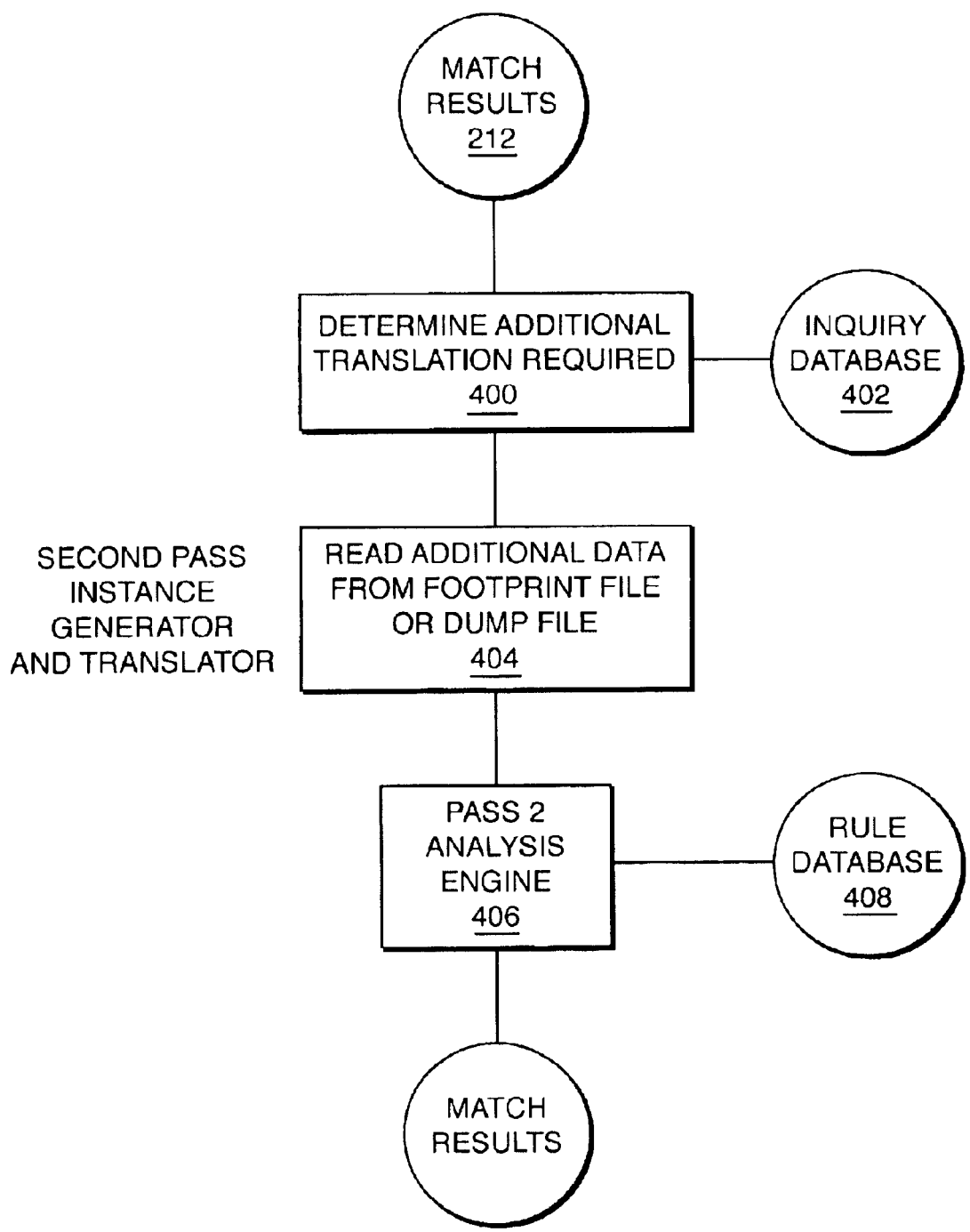
FIG. 4, a flow diagram illustrating second pass analysis.

In this event, match results 212 from a first pass through analysis engine 204, as previously discussed, are passed to a task 400 (FIG. 4) that determines additional information that can be collected from the footprint file 202, or even from the dump file 116 if the dump file is still available. This determination is made according to information in an further inquiry database 402.

Once the determination has been made, a second instance generator and translator 404 reads the required additional information from the footprint file 202. This is also translated for input to the analysis engine, and a second pass analysis engine 406 is run with additional analysis rules 408. Match results 410 of the second pass analysis engine 406 are then passed into the merge process 214 for merging with fix suggestions from fix database 216 as previously described.

Figure 2:
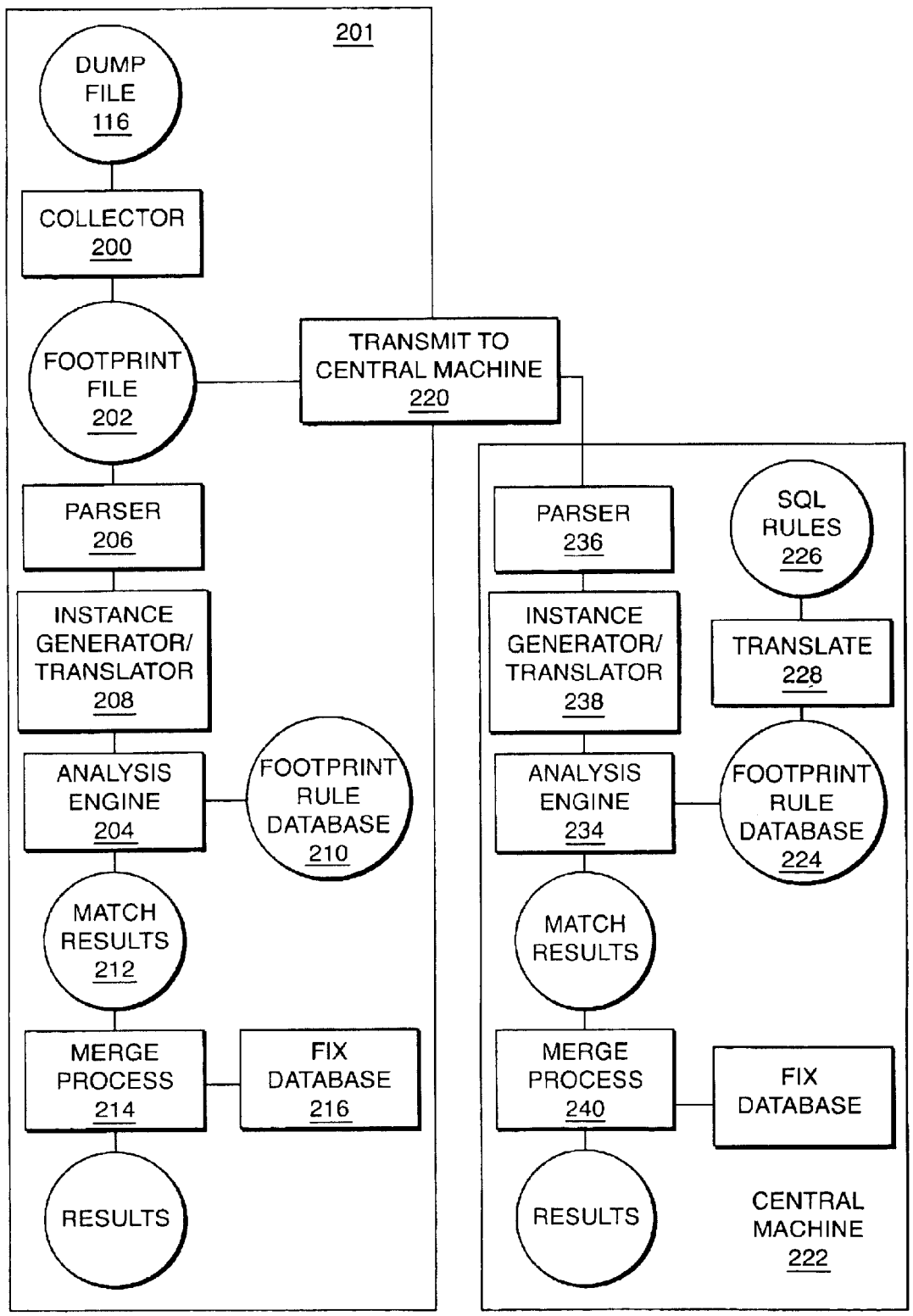
FIG. 2, a flow diagram of the automated dump analysis of the present invention.

For example but not by way of limitation, the collector 200 (FIG. 2) may collect a list of names and versions of all modules running on the system at the time of the crash, with a stack trace indicating the identity of the module that crashed and the location within that module of the fatal error.

The first pass of instance generator and translator 202 extracts the stack trace for use by the analysis engine. This may indicate a possibility that the crash is a result of the presence of another, conflicting or incompatible, module. In this case, the inquiry database 402 (FIG. 4) indicates need to examine the list of names and versions of other modules that were running at the time of the crash. The second pass instance generator and translator 404 then extracts this list from the footprint file and translates it for input to the second pass analysis engine 406. The second pass analysis engine 406 can then check if the possibly conflicting module is present in the system.

It is known that machines may not have the very latest version of some elements of software normally run on those machines. It is possible that the rule database 210 and fix database 216 on an affected machine may be outdated.

In order to confirm a diagnosis and repair, the footprint file 202 (FIG. 2) may be transmitted 220 from the affected machine 201 to a centrally located machine 222 that has the latest rule database 224. CAT is then rerun on that machine. The rule database 224 has been prepared through writing an SQL rule set 226, and translating 228 these rules into the database 224; the same method used to prepare the affected machine's 201 rule database 210.

In running CAT on the centrally located machine 222, the centrally located machine 222 runs a parser 236, instance generator and translator 238, analysis engine 234, and merge process 240 similar to the corresponding processes of the affected machine 201.

A computer program product is any machine-readable media or combination thereof, such as an EPROM, ROM, RAM, DRAM, disk memory, or tape, having recorded on it computer readable code that, when read by and executed on a computer, instructs that computer to perform a particular function or sequence of functions. It is anticipated that the expert system herein described will be a computer program product, as it will appear in memory before and during execution.

While the invention has been particularly shown and described with reference to a preferred embodiment thereof, it will be understood by those skilled in the art that various other changes in the form and details may be made without departing from the spirit and scope of the invention.

What is claimed is:

1. A method for analyzing abnormal conditions of a computer operating system comprising:
    detecting an abnormal condition of the operating system as the operating system executes on a machine;
    writing a dump file with state information of the operating system at the time of the abnormal condition;
    collecting footprint information from the dump file into a footprint file, including footprint parameters appropriate to the type and version of the operating system;
    determining a matching underlying cause by searching a footprint rule database for a match against the footprint information;
    extracting cause and repair information corresponding to the underlying cause from a knowledgebase;
    merging the cause and repair information with the footprint information;
    rebooting the machine into a second operating system after writing a dump file; and
    inspecting the dump file to detect the type and version of the operating system.

2. The method of analyzing abnormal conditions of an operating system of claim 1, further comprising rebooting the machine into a diagnostic mode of the operating system.

3. The method of analyzing abnormal conditions of an operating system of claim 1, wherein determining a matching underlying cause is performed on the aforesaid machine.

4. The method of analyzing abnormal conditions of an operating system of claim 3, wherein determining a matching underlying cause is repeated on a second machine.

5. A computer program product for analyzing abnormal conditions of a computer operating system, the computer program product comprising a machine readable media having machine readable instructions comprising instructions for performing:
    collecting footprint information from a crash dump file into a footprint file, configured to collect footprint parameters appropriate to the type and version of the operating system;
    determining a matching underlying cause by searching a footprint rule database for a match against the footprint information;
    extracting cause and repair information corresponding to the underlying cause from a knowledgebase;
    merging the cause and repair information with the footprint information for display to a technician; and
    inspecting the dump file to detect the type and version of the operating system.

6. The computer program product of claim 5, the machine readable instructions further comprising machine readable instructions for rebooting the machine into a diagnostic mode of the operating system.

7. The computer program product of claim 5, the machine readable instructions further comprising machine readable instructions for rebooting the machine into an operating system different from an operating system under which the dump file was written.

* * * * *